United States Patent
Liu et al.

(10) Patent No.: US 12,359,052 B2
(45) Date of Patent: Jul. 15, 2025

(54) DIMENSIONALLY STABLE ACRYLIC ALLOY FOR 3-D PRINTING

(71) Applicant: Arkema France, Colombes (FR)

(72) Inventors: David Shin-Ren Liu, Bala Cynwyd, PA (US); Jack J. Reilly, Blue Bell, PA (US); Mark A. Aubart, West Chester, PA (US)

(73) Assignee: ARKEMA FRANCE, Puteaux (FR)

( * ) Notice: Subject to any disclaimer, the term of this patent is extended or adjusted under 35 U.S.C. 154(b) by 0 days.

(21) Appl. No.: 18/158,091

(22) Filed: Jan. 23, 2023

(65) Prior Publication Data
US 2023/0159739 A1  May 25, 2023

(51) Int. Cl.

| | |
|---|---|
| *C08L 33/08* | (2006.01) |
| *B29C 64/118* | (2017.01) |
| *B29C 64/321* | (2017.01) |
| *B33Y 70/10* | (2020.01) |
| *C08L 1/12* | (2006.01) |
| *C08L 67/04* | (2006.01) |
| *B29K 33/00* | (2006.01) |
| *B33Y 10/00* | (2015.01) |
| *B33Y 70/00* | (2020.01) |
| *B33Y 80/00* | (2015.01) |
| *C08K 3/04* | (2006.01) |
| *C08K 3/26* | (2006.01) |
| *C08K 3/30* | (2006.01) |
| *C08K 3/34* | (2006.01) |

(Continued)

(52) U.S. Cl.
CPC ............ *C08L 33/08* (2013.01); *B29C 64/118* (2017.08); *B29C 64/321* (2017.08); *B33Y 70/10* (2020.01); *C08L 1/12* (2013.01); *C08L 67/04* (2013.01); *B29K 2033/08* (2013.01); *B33Y 10/00* (2014.12); *B33Y 70/00* (2014.12); *B33Y 80/00* (2014.12); *C08K 3/041* (2017.05); *C08K 3/042* (2017.05); *C08K 2003/265* (2013.01); *C08K 2003/3045* (2013.01); *C08K 3/346* (2013.01); *C08K 3/36* (2013.01); *C08K 3/40* (2013.01); *C08K 7/06* (2013.01); *C08K 7/14* (2013.01); *C08L 2207/53* (2013.01)

(58) Field of Classification Search
CPC . C08L 33/08; C08L 1/12; C08L 67/04; B29C 64/321; B29C 64/118; B33Y 70/10; B33Y 10/00
USPC ......................................................... 524/556
See application file for complete search history.

(56) References Cited

U.S. PATENT DOCUMENTS

| | | | | |
|---|---|---|---|---|
| 4,397,986 | A * | 8/1983 | Hornbaker | ............. C08L 25/08 525/166 |
| 11,560,473 | B2 * | 1/2023 | Liu | ...................... B29C 64/321 |

(Continued)

*Primary Examiner* — Fred M Teskin
(74) *Attorney, Agent, or Firm* — Buchanan Ingersoll & Rooney PC

(57) ABSTRACT

An acrylic alloy composition that can be 3-D printed by a material extrusion additive manufacturing process, an acrylic filament that has a very uniform diameter useful in the extrusion additive manufacturing process, acrylic articles made from the acrylic alloy composition by a material extrusion additive process, and a material extrusion additive manufacturing process for producing the acrylic articles. The acrylic alloy composition is an alloy of an acrylic polymer, and a low melt viscosity polymer, such as polylactic acid. The alloy may optionally be impact modified, preferably with hard core core-shell impact modifiers.

18 Claims, 1 Drawing Sheet

(51) Int. Cl.
*C08K 3/36* (2006.01)
*C08K 3/40* (2006.01)
*C08K 7/06* (2006.01)
*C08K 7/14* (2006.01)

(56) References Cited

U.S. PATENT DOCUMENTS

| | | |
|---|---|---|
| 2003/0199628 A1 | 10/2003 | Weese et al. |
| 2012/0164364 A1* | 6/2012 | Mehlmann ............ C08F 265/06 525/190 |
| 2014/0134335 A1 | 5/2014 | Pridoehl et al. |
| 2016/0060449 A1 | 3/2016 | Shulga et al. |
| 2016/0068678 A1 | 3/2016 | Luo et al. |
| 2016/0319120 A1 | 11/2016 | Niessner et al. |
| 2018/0237627 A1 | 8/2018 | Liu et al. |

\* cited by examiner

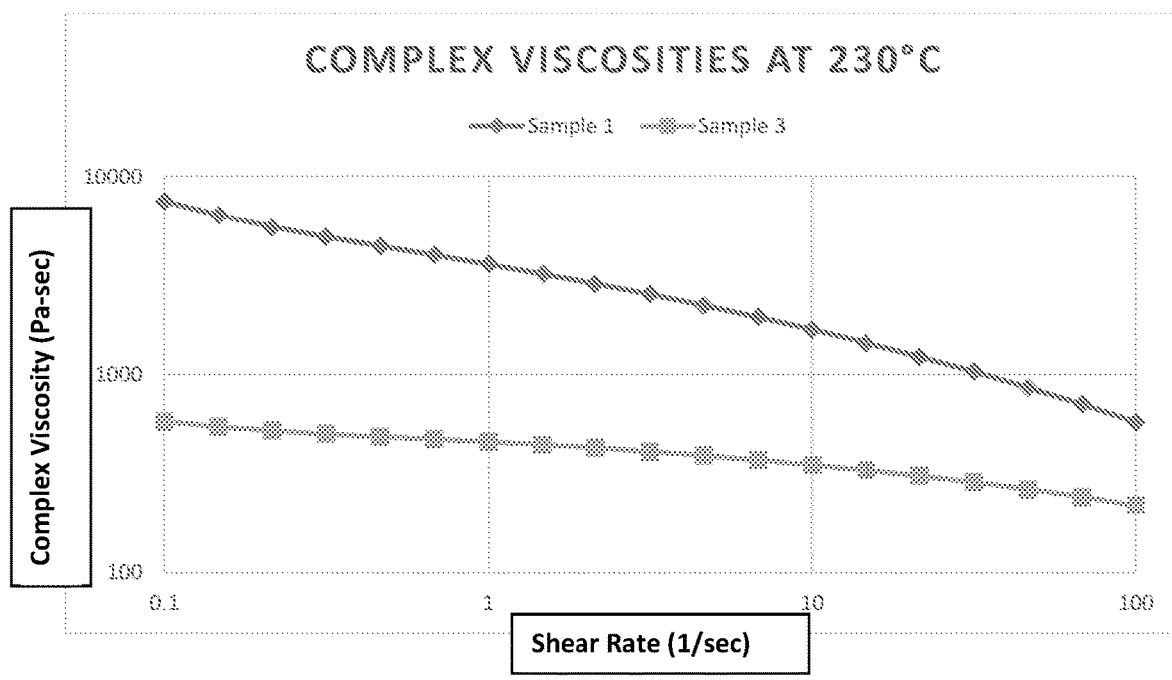

DIMENSIONALLY STABLE ACRYLIC ALLOY FOR 3-D PRINTING

CROSS REFERENCE TO RELATED APPLICATIONS

The present application is a continuation of U.S. application Ser. No. 16/305,123, filed on Nov. 28, 2018, which is a U.S. national stage of International Application No. PCT/US2017/035200, filed on May 31, 2017, which claims the benefit of U.S. Provisional Application No. 62/343,903, filed on Jun. 1, 2016. The entire contents of each of U.S. application Ser. No. 16/305,123, International Application No. PCT/US2017/035200, and U.S. Provisional Application No. 62/343,903 are hereby incorporated herein by reference in their entirety.

TECHNICAL FIELD

The invention relates to an acrylic alloy composition that can be 3-D printed by a material extrusion additive manufacturing process, to an acrylic filament that has a very uniform diameter useful in the extrusion additive manufacturing process, to acrylic articles made from the acrylic alloy composition by a material extrusion additive process, and to a material extrusion additive manufacturing process for producing the acrylic articles. The acrylic alloy composition is an alloy of an acrylic polymer, and a low melt viscosity polymer, such as polylactic acid. The alloy may optionally be impact modified, preferably with hard core core-shell impact modifiers.

BACKGROUND

Equipment advances and reduction in pricing have allowed 3D printing to become widely adopted in homes, schools, and industry as a fast, simpler, and often cheaper way to prototype and make custom end use parts. Specifically, material extrusion additive manufacturing 3D printing (also known as fused filament fabrication or fused deposition modeling), has emerged as a tool of choice for direct consumer use, larger scale production, and quick thermoplastic prototyping as it is the easiest to operate and it produces the least waste and shortest turnaround time of the 3D printing technologies.

Many materials have been used to produce 3-D printed articles for a wide variety of end uses, from chocolate to collagen. Thermoplastic materials are especially well adapted for use with material additive extrusion printers. Unfortunately, there have been few thermoplastics available that provide good mechanical properties, transparency, and ease of print.

Polylactic acid (PLA) is widely used for desktop home printers as it prints well and has very low warpage. Unfortunately, it has a low use temperature, poor chemical stability and is yellowish when not colored with dyes or pigments. ABS is a more stable commonly used "engineering" thermoplastic for 3-D printing and has a higher use temperature—but has a high warpage level, is not transparent, and has a printed elongation at break of less than 6%.

Acrylic polymers are well known for their clarity, sparkling color, surface gloss, depth of image, and weather resistance. They have similar use temperatures to ABS. Unfortunately, the brittleness associated with acrylic polymers makes them impractical for making filaments for use in extrusion additive 3-D printing.

There is a desire to have the physical weathering resistance, transparency, and appearance of an acrylic polymer in a material extrusion additive printed article, but with low warpage and no need for an adhesive or heated chamber, as with PLA, yet having the mechanical and chemical properties of ABS, and additionally having good impact resistance, and excellent optical clarity.

Surprisingly, it has now been found that an alloy of a polymethyl methacrylate-based polymer with a low viscosity polymer such as polylactic acid (PLA), and optionally having impact modifiers, provides an acrylic filament that has the flexibility and flow properties to be printed, while retaining the transparency and strength of PMMA. The PMMA blend composition exhibits a very low variance in diameter when extruded as a filament, and the resulting filament is capable of being coiled. The composition of the invention can be easily printed without the need for adhesives or a heated chamber.

SUMMARY

The invention relates to an acrylic alloy composition that is useful in a material extrusion additive manufacturing process. The acrylic alloy composition comprises:
a polymer matrix blend comprising:
1) one or more acrylic polymers having a weight average molecular weight of from 50,000 to 300,000, and preferably from 75,000 to 150,000 g/mol, and having less than 5% above 500,000 g/mol,
2) 5 to 60 weight percent, preferably 9 to 40 weight percent of one or more low viscosity polymers that are compatible, semi-miscible, or miscible with the acrylic polymer, said low viscosity polymers having a melt flow rate of greater than 10 g/10 minutes and preferably greater than 25 g/10 minutes, as measured by ASTM D1238 at 230° C./10.4 kg of force,
3) optionally 0 to 60 weight percent of impact modifiers, preferably 9 to 40 weight percent,
wherein said acrylic composition has a viscosity at a shear of 1 $\sec^{-1}$ of less than 100,000 Pa-sec, preferably less than 10,000, more preferably from 50 to 1,000 Pa-sec at a temperature of 230° C., and a viscosity of 20 to 2,000 Pa-s at a shear rate of 100 $\sec^{-1}$ at a temperature of 230° C., as measured by a rotational viscometer according to ASTM C965.

The composition can contain additives, including additives that provide visual special effects.

The invention also relates to filaments for a material extrusion additive manufacturing process having a very uniform diameter when made by conventional filament extrusion equipment, in which the diameter of the filament varies by less than 5% over a 10 foot section.

The invention further relates to a material additive extrusion process using the acrylic alloy composition, and acrylic articles formed by the process.

BRIEF DESCRIPTION OF THE DRAWINGS

FIG. 1 depicts the shear related viscosity of Samples 1 and 3.

DETAILED DESCRIPTION

The invention relates to an acrylic composition that can be formed by a material extrusion additive manufacturing process (also referred to in this application as 3D printing), to an acrylic filament useful in the process having a very uniform diameter, to acrylic articles made from the alloy composition of the invention, and to a process for producing the acrylic extrusion additive articles.

All references cited are incorporated herein by reference. As used herein, unless otherwise described, percent shall mean weight percent. Molecular weight is a weight average molecular weight as measured by GPC. In cases where the polymer contains some cross-linking, and GPC cannot be applied due to an insoluble polymer fraction, soluble fraction/gel fraction or soluble faction molecular weight after extraction from gel is used.

"Copolymer" is used to mean a polymer having two or more different monomer units. "Polymer" is used to mean both homopolymer and copolymers. Polymers may be straight chain, branched, star, comb, block, or any other structure. The polymers may be homogeneous, heterogeneous, and may have a gradient distribution of co-monomer units.

"Low shear viscosity", as used herein is a measure of the melt viscosity (ASTM D3835-0) at a relatively low shear rate. This relates to the viscosity of the melt following printing. For purposes of this invention, the low shear rate at which viscosity is measured is at 1 sec$^{-1}$. The actual shear rate of the polymer alloy following printing is essentially zero. "High shear viscosity" as used herein is a measure of the melt viscosity at a relatively high shear rate. This relates to the viscosity of the melt as it moves through the nozzle on a 3-D printer. The high shear rate viscosity is measured herein as the melt viscosity at a shear of 100 sec$^{-1}$. The viscosity of the melt under high shear is generally lower than the viscosity of the polymer melts under low shear, due to shear thinning.

Acrylic Alloy

The acrylic alloy of the invention contains at least one acrylic polymer, at least one low melt viscosity polymer that is miscible, semi-miscible or compatible with the acrylic polymer, and optionally impact modifier. The acrylic alloy may further contain other additives.

Acrylic Polymer

"Acrylic polymer", as used herein is meant to include polymers, copolymers, and terpolymers formed from alkyl methacrylate and alkyl acrylate monomers, and mixtures thereof. The alkyl methacrylate monomer is preferably methyl methacrylate, which may make up from 50 to 100 percent of the monomer mixture. 0 to 50 percent of other acrylate and methacrylate monomers or other ethylenically unsaturated monomers, included but not limited to, styrene, alpha methyl styrene, acrylonitrile, and crosslinkers at low levels may also be present in the monomer mixture. Other methacrylate and acrylate monomers useful in the monomer mixture include, but are not limited to, methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as methacrylic acid and acrylic acid can be useful for the monomer mixture. Most preferably the acrylic polymer is a copolymer having 70-99.5 weight percent of methyl methacrylate units and from 0.5 to 30 weight percent of one or more $C_{1-8}$ straight or branched alkyl acrylate units.

The acrylic polymer has a weight average molecular weight of from 50,000 g/mol to 300,000 g/mol, and preferably from 75,000 g/mol to 150,000 g/mol. It has been found that the use of acrylics having a lower weight average molecular weight in the range, provides an increase in the density of material extrusion additive printed articles, increases the transparency, and reduces warpage.

Preferably, the acrylic polymer contains little or no very high molecular weight fraction polymer, with less than 5 weight percent of the acrylic polymer, and preferably less than 2 weight percent of the acrylic polymer having a molecular weight of greater than 500,000 g/mol.

In another embodiment, the acrylic polymer comprises a blend of two or more of the polymers described in the above two embodiments.

The acrylic polymer can be formed by any known means, including but not limited to bulk polymerization, emulsion polymerization, solution polymerization and suspension polymerization.

Low Melt Viscosity Polymers

The low melt viscosity polymer in the acrylic alloy composition must be compatible, semi-miscible, or miscible with the acrylic polymer. The low melt viscosity polymer and acrylic polymer should be capable of being blended in a ratio such that a single intimate mixture is generated without separation into distinct bulk phases. By "low melt viscosity polymer", as used herein means polymers having a melt flow rate of greater than 10 g/10 minutes, and preferably greater than 25 g/10 minutes as measured by ASTM D1238 at 230° C./10.4 kg of force.

In one embodiment, the low melt viscosity polymer is a low molecular weight acrylic polymer or copolymer, meeting the high melt flow rate criteria. The low molecular weight acrylic polymer has a weight average molecular weight of less than 70,000, preferably less than 50,000, more preferably less than 45,000, and even less than 30,000 g/mol. Acrylic copolymers are preferred, and copolymers with a Tg of less than 100° C., and less than 90° C. are preferred from increased flexibility.

In a preferred embodiment, the low melt viscosity polymer of the invention is a polymer other than an acrylic polymers. The non-acrylic low melt viscosity polymer of this invention includes, but is not limited to, polyesters, cellulosic esters, polyethylene oxide, polypropylene glycol, polyethylene glycol, polypropylene glycol, styrene-acrylonitrile copolymers, polyvinyl chloride, polyvinyl acetate, polyvinyl alcohol, ethylene-vinyl acetate copolymers, polyvinylidene fluoride and its copolymers, olefin-acrylate copolymers, olefin-acrylate-maleic anhydride copolymers, and maleic anhydride-styrene-vinyl acetate copolymers, and mixtures thereof.

Useful polyesters include, but are not limited to: poly (butylene terephthalate), poly(ethylene terephthalate), polyethylene terephthalate glycol, polylactic acid. A preferred polyester is polylactic acid.

Useful cellulosic esters include, but are not limited to: cellulose acetate, cellulose triacetate, cellulose propionate, cellulose acetate propionate, cellulose acetate butyrate, and cellulose acetate phthalate.

In one embodiment, the low melt viscosity polymer has a weight average molecular weight higher than the entanglement molecular weight of that polymer, as measured by gel permeation chromatography.

The low melt viscosity polymer of the invention makes up from 5 to 60 weight percent of the total alloy composition, preferably from 9 to 40 weight percent.

Impact Modifiers

While the acrylic alloy of the invention can contain no impact modifier, in a preferred embodiment the acrylic alloy includes one or more types of impact modifiers. Preferably the acrylic composition contains impact modifiers at a level of from 5 to 60 weight percent, preferably 9 to 40 weight percent, and more preferably from 20 to 45 weight percent, based on the overall alloy composition. The impact modifiers can be any impact modifier that is compatible, miscible, or semi-miscible with the acrylic alloy composition, as known in the art. Useful impact modifiers include, but are not limited to linear block copolymers and both soft-core and hard-core core-shell impact modifiers. In a preferred embodiment, the impact modifiers have acrylic blocks, or acrylic shells.

While not being bound by any particular theory, it is believed that the impact modifier provides elongation, flexibility, and toughness.

In a preferred embodiment, the impact modifier of the invention is a multi-stage, sequentially-produced polymer having a core/shell particle structure of at least three layers made of a hard core layer, one or more intermediate elastomeric layers, and a hard shell layer. The presence of a hard core layer provides a desirable balance of good impact strength, high modulus, and excellent UV resistance, not achieved with a core/shell modifier that possesses a soft-core layer.

The hard core layer (Tg>0° C., preferably Tg>20° C.) is typically a single composition polymer, but can also include the combination of a small amount of a low Tg seed on which the hard core layer is formed. For example, a small 5% rubber core seed that becomes dispersed into a hard core layer would be included in the invention as a hard core layer, as long as the combination behaves as a hard core layer. The hard core layer can be chosen from any thermoplastic meeting the Tg requirements. Preferably, the hard core layer is composed primarily of methacrylate ester units, acrylate ester units, styrenic units, or a mixture thereof. Methacrylate esters units include, but are not limited to, methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate and 2-methoxyethyl methacrylate. Acrylate ester units include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cycloheyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Preferably the acrylate ester units are chosen from methyl acrylate, ethyl acrylate, n-butyl acrylate, 2-ethylhexyl acrylate and octyl acrylate. Styrenics units include styrene, and derivatives thereof such as, but not limited to, alpha-methyl styrene, and para methyl styrene. In one embodiment the hard-core layer is all-acrylic.

The intermediate layer or layers are elastomeric, having a Tg of less than 0° C., and preferably less than −20° C. Preferred elastomers include polymers and copolymers of alkyl acrylates, diener, styrenics, and mixtures thereof. Preferably the soft intermediate layer is composed mainly of acrylate ester units. Acrylate ester units useful in forming the soft block include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cycloheyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Preferably the acrylate ester units are chosen from methyl acrylate, ethyl acrylate, n-butyl acrylate, 2-ethylhexyl acrylate and octyl acrylate. Useful diener include, but are not limited to isoprene and butadiene. Useful styrenics include, but are not limited to alpha-methyl styrene, and para methyl styrene.

The shell layer can be made of one or more shell layers, having a Tg>0° C., more preferably Tg>20° C. The shell layer may be the same or different composition from the hard core layer.

Preferably the multi-stage polymer is a three stage composition wherein the stages are present in ranges of 10 to 40 percent by weight, preferably 10 to 20 percent, of the first stage (a), 40 to 70 percent, preferably 50 to 60, of the second intermediate stage (b), and 10 to 50 percent, preferably 20 to 40, of the final stage (c), all percentages based on the total weight of the three-stage polymer particle.

In one embodiment the core layer is a crosslinked polymethylmethacrylate-ethylacrylate copolymer, the middle layer is a crosslinked polybutylacrylate-styrene copolymer, and the outer shell is a polymethylmethacrylate-ethylacrylate copolymer.

The multi-stage polymer can be produced by any known technique for preparing multiple-stage, sequentially-produced polymers, for example, by emulsion polymerizing a subsequent stage mixture of monomers in the presence of a previously formed polymeric product. In this specification, the term "sequentially emulsion polymerized" or "sequentially emulsion produced" refers to polymers which are prepared in aqueous dispersion or emulsion and in which successive monomer charges are polymerized onto or in the presence of a preformed latex prepared by the polymerization of a prior monomer charge and stage. In this type of polymerization, the succeeding stage is attached to and intimately associated with the preceding stage.

In a preferred embodiment the refractive index of the core/shell particle matches the total refractive index of the matrix made of the acrylic polymer and the low melt viscosity polymer. By match is meant that the refractive index of the core/shell particle should be within 0.03 units of the matrix polymer blend, and preferably within 0.02 units.

In one embodiment, the acrylic alloy of the invention could contain reactive functional groups, either by using a functional monomer, or by a post-treatment. Once the functional polymer is processed into a useful article, it could then be reacted or cross-linked, such as by UV radiation, or e-beam, for increased integrity. Cross-linking is known in the art to generally increase the tensile and flexural moduli, and reduce solubility and permeability of the cross-linked material, all of which could be advantageous physical property enhancements depending on the material's final application.

Additives

The acrylic alloy may further contain other additives typically present in acrylic formulations, including but not limited to, stabilizers, plasticizers, fillers, coloring agents, pigments, antioxidants, antistatic agents, surfactants, toner, refractive index matching additives, additives with specific light diffraction or light reflection characteristics, and dispersing aids. If fillers are added, they represent 0.01 to 50 volume percent, preferably 0.01 to 40 volume percent, and most preferably from 0.05 to 25 volume percent of the total volume of the acrylic alloy composition.

The fillers can be in the form of powders, platelets, beads, and particles. Smaller materials, with low aspect ratios are preferred, to avoid possible fouling of the nozzle, though this is less important when the acrylic alloy is used with larger nozzle sizes. Useful fillers include, but are not limited to, carbon fiber, carbon powder, milled carbon fiber, carbon nanotubes, glass beads, glass fibers, nano-silica, Aramid fiber, polyarylether ketone fibers, $BaSO_4$, talc, $CaCO_4$, graphene, nano-fibers (generally having an average fiber length of from 100 to 150 nm) and hollow glass or ceramic spheres.

In one embodiment, the filler is added to produce special visual effects. Useful fillers include colorants, dyes, and inorganic particles, including fluorescent dyes, metal filings, and flakes.

Natural-looking variegated materials, that have a metallic or opalescent appearance can be made to simulate natural materials, such as granite, minerals, stone, metal ore The metal or pearlescent material is present in the alloy at from 0.01 to 10 weight percent, and preferably 3.5 to 6.5% weight percent, based on the weight of the alloy composition. In one embodiment, the alloy composition contains pearlescent compounds and no metal compound. In another embodiment the thermoplastic composite contains pearlescent compounds and metal compound(s). In a preferred embodiment, the thermoplastic composite contains metal compound(s) and no pearlescent compound.

Metal compounds useful in the invention include, but are not limited to, metal flakes, chips, and filings. Useful metal compounds include metals, metal-containing molecules and complexes of transition metals, or lanthanide metals, and combinations thereof. Examples include aluminum, copper, silver, gold, platinum, palladium, nickel, cobalt, tin, niobium, chromium, stainless steel, and combinations or alloys thereof, including, for example, brass and bronze. The metal compound may also be a metal carbide, metal oxide, metal nitride, metal sulfide, and combinations thereof. The metal compounds can have particle sizes averaging from 1 micron to 25 micron and preferably 2 microns to 20 microns in the largest direction. The metal compounds may be flat flakes or may be particles of various shapes. Metal flake pigments generally have a thickness in the range of from 40 to 150 nm.

Pearlescent compounds useful in the invention are those known in the art and include, but are not limited to, platelets of mineral mica which is muscovite or potassium aluminum hydroxide fluoride, and platelets based on titanium dioxide. The platelets are coated with a thin layer of metal oxide selected from the group consisting of rutile titanium dioxide, ferric oxide and tin oxide and mixtures thereof. The pearlescent compound platelets generally have a particle size of about 2 to about 130 microns, more preferably about 10 to about 50 microns. The pearlescent pigments may be colored or non-colored.

Alloy

The acrylic polymer, low melt viscosity polymer, and optional impact modifier and other additives can be blended together in any order, and by any means known in the art to form the acrylic alloy composition of the invention. For example, the components can be dry-blended prior to being melted, or directly melt blended together, such as in an extruder, or intimately mixed in a suitable solvent.

The acrylic alloy composition of the invention can be defined by its low shear and high shear viscosity. Preferably, the acrylic alloy composition of the invention has a low shear rate viscosity as measured at 1 sec$^-$ of less than 100,000 Pa-s. by a rotational viscometry according to ASTM C965, and preferably of less than 10,000 Pa-s, and more preferably less than 1,000 Pa-s at a temperature of 230° C. Preferably the low shear viscosity is greater than 50 Pa-s, and more preferably greater than 100 Pa-s. If the low shear viscosity is less than this, it is likely not to have a sufficient melt strength for the production of filament. While not being bound by any particular theory, this low-shear viscosity range seems to allow the printed polymer to stay where it is placed, and yet still be fluid enough for good interlayer adhesion and fusion. The low and high shear viscosity ranges are for the alloy composition before the addition of additives. Some additives could push the viscosity much higher.

Preferably the acrylic alloy composition has a high shear viscosity of from 20 to 2,000 Pa-s, preferably 25 to 1,000 Pa-s, preferably 30 Pa-s to 500 Pa-s, at the temperature of deposition and 100 sec$^{-1}$. The key viscosity behavior is a combination of both the viscosity of the material coming out of the nozzle, and how fluid the material stays as the thermoplastic solidifies. A typical nozzle temperature for use in determining the high and low shear viscosity is 230° C.

Key performance properties of the composition of the invention include:

1) Excellent optical clarity. A compression molded plaque formed from a clear acrylic alloy composition of the invention having a 2 mm thickness has a total white light transmittance of greater than 80%, preferably greater than 90% and most preferably greater than 92%, with a haze of less than 10%, preferably less than 4%, when measured according to ASTM D1003.
2) Tensile elongation at break: The composition of the invention has a tensile elongation, as measured by ASTM D638 of greater than 10 percent, and preferably greater than 20 percent.
3) Little or no warpage, as measured using the following warp test: Various thin walls of about 1 cm in height, and from 2 cm to 20 cm in length are printed by two passes of the nozzle onto a heated glass base plate heated to the material's vicat temperature. The degree of warpage was observed qualitatively (see explanation in example 3) by viewing the printed material from the side, based on the level of detachment from the base plate. The warpage relates to the ability of a part to adhere to the base plate of a melt extrusion printer, which is necessary for successful printing.
4) Yield stress: The stress at yield of greater than 30 and more preferably greater than 35 MPa when measured by ASTM D638.
5) Fill density: articles that are extrusion additive manufactured with the acrylic alloy composition of the invention have a fill density of greater than 85 percent, preferably greater than 90 percent, and most preferably greater than 95 percent, as calculated by dividing the density of the printed part by the bulk density of the material.
6) Printed article clarity: Extrusion additive manufactured articles using the acrylic alloy composition have a light transmittance of greater than 50%, preferably greater than 60%, and more preferably greater than 65% when measured on a 2.1 mm thick sample using ASTM D1003, the printed article having 10 layers and each layer having line width of 0.4 mm.

Filament

In one embodiment, the acrylic composition is extruded into a filament, for use in a material extrusion additive process. The filament can be a single strand of the acrylic composition or can be in the form of a coextruded multi-phase filament. In one embodiment, the filament has a middle layer composition of the acrylic alloy, surrounded by a sheath containing a different acrylic composition, for example containing a special effects additive, or vice versa.

Filament formed from the acrylic composition of the invention has little shrinkage or warpage, forming a filament that is very uniform in diameter. The filament having the acrylic composition of the invention varies in diameter by less than +/−5% over a ten foot length, and preferably less than 3 percent variance in diameter over ten foot of length. The low variance in the diameter of the filament is a key to its use in the material extrusion additive manufacturing process, as the calculations on the feed rate, and thereby the resulting density of the printed article, are based on calculations assuming a constant filament diameter.

Material Extrusion Additive Process:

The acrylic alloy of the invention is used as a powder or pellets, and in a preferred embodiment is formed into a filament, generally by an extrusion process.

The acrylic alloy composition will be 3D printed in a material extrusion (fused deposition modeling, fused filament fabrication) style 3D printer with or without filaments (any size diameter, including 1.75 mm, 2.85 mm or other sizes) and with any sized nozzle at any speed that can use filament, pellets, powder, or other forms of the acrylic alloy composition. The 3-D printing of this invention is not a laser sintering process. The compositions could be made into filaments for such purposes. They could potentially be even sprayed-nozzled onto the surface (sprayed melted plastic) to be printed, such as by Arburg Freeformer technology.

A general description of the printing process would involve the following steps: Feeding the acrylic alloy composition filament, pellets, or powder into the 3D printer. The computer controls of the printer will be set to provide a set volume flow of material, and to space the printed lines at a certain spacing. The machine will feed the acrylic alloy composition to a heated nozzle at the set speed, the printer moving the nozzle into the proper position for depositing the set amount of acrylic alloy composition.

In a preferred embodiment, the polymer has a low shear melt viscosity as described above. The printer would generally have a heated bed of 50-150° C. (preferably above 60° C.).

In one preferred embodiment, the 3-D printer is programmed to operate at a slight overflow of 1% to 10% overflow. This means that the volume of the acrylic alloy composition fed by the printer is higher than the calculated volume required for the 3-D article being formed. The overflow packs the acrylic alloy composition closer together, increasing the part density while increasing the strength, mechanical, and optical properties of the printed article. The overflow can be set by two different means. In the first method, the software is set to feed a higher percent of material into the nozzle than would be normally needed. In the second method, the software would be set to decrease the spacing between lines, and thus create an overlap in the lines, resulting in extra material being printed into the article.

Process parameters of the 3-D printer can be adjusted to minimize shrinkage and warpage, and to produce 3-D printed parts having optimum strength and elongation. The use of selected process parameters applies to any extrusion/melt 3D printer, and preferably to filament printing.

EXAMPLES

Samples:
Sample 1: is an impact modified polymethyl methacrylate polymer blended with polylactic acid, having 35-45% impact modifier, and about 25-35% polylactic acid, and a melt flow rate at 230° C. and 3.8 kg of about 3.9 g/10 min.
Sample 2 (comparative): an impact modified polymethyl methacrylate polymer blended with polylactic acid, having 20-30% impact modifier, and about 35-40% polylactic acid, and a melt flow rate at 230° C. and 3.8 kg of about 3.9 g/10 min. The acrylic copolymer contains a high molecular weight polymer component.
Sample 3: is an impact modified polymethyl methacrylate polymer blended with polylactic acid, having 25-35% impact modifier, and about 25-35% polylactic acid, and a melt flow rate at 230° C. and 3.8 kg of about 15 g/10 min.
Sample 4: Impact modified acrylic copolymer without a high molecular weight component, having about 35-42% impact modifier, and about 10-15% of a matting agent.

The viscosities of several of the samples under differing shear rates, is shown in FIG. 1.

Example 1. Method of Making Filaments

Filaments were made using a desktop mini extruder (~1 ft screw length) Filabot extruder, by inputting dried pellets and producing filament. The Filabot has only one adjustable setting (extruding temp); using that and the distance of air cooling (height from extruder to collecting box) we could tune the diameter of filament to the desired filament diameter (between 2.75-2.9 mm). Once set, the diameter of the filament extruded would be very uniform, within ±0.05 mm of the mean. The temperatures used in the examples were between 180 and 210° C. Lower temperatures would cause the screw of the extruder to stop turning (too high torque), and higher temperature would cause the filaments to stick to each other as the cooling time/distance became insufficient. In a more robust system with more powerful torque and a cooling line the processing range could be increased.

Example 2. Extrusion Printing

The filaments were dried overnight, and 3D printed on an Ultimaker® 2 desktop FDM (FFF, material extrusion) machine. The design was manipulated and sliced by Cura; a standard 3D software provided by Ultimaker. Unless otherwise specified, all parts here are printed solid with 0.8 mm walls, and diagonal crisscross in-fill and 0.2 mm/layer thickness and nozzle diameter or 0.4 mm. For best results, the temperature of the nozzle was set between 230-250 C, build plate heated to 75° C., print speed normal (50 mm/s) with 5-10% overflow (for increased part density), fan speed at 50%. No glue or adhesives were needed on the glass plate. The extrusion printed part popped off when the glass plate cooled.

Example 3. Warp Testing

A simple test was created to measure and compare base warpage of various materials on the 3D printing build plate (base warpage being critical in that if a part does not adhere to the base, then the part cannot be printed, and it is an indication of overall warpage though that is more difficult to quantify).

The test involved printing thin lines/walls (of 0.8 mm thick, two paths of the nozzle) of various lengths of different materials on a heated glass plate (heated to the material's vicat temp) and looking to see which materials and at what lengths the parts warped/came off the plate. The lengths tested were from 2 cm to 20 cm and a height of about 1 cm.

Each print was then evaluated from the edges as either showing no warpage, occasional warpage (some prints warping other times not), small warpage (any detachment from the base), medium warpage (a couple mm from the base), large warpage (>0.5 cm from the base), could not print (part came off the base before it finished printing). The results are shown in Table 1.

It was found that pigments could play a role, but generally from pure materials we saw that PLA did not warp and ABS warped a lot as expected.

The Sample 1 and Sample 3, both devoid of super high MW components, also did not warp. Sample 2, which has some high MW PMMA components did warp and so did Sample 4. Sample 3 seems to perform better than Sample 1, but both performed significantly better than acrylonitrile/butadiene/styrene (ABS) and similar to polylactic acid (PLA). In an eye test for warpage in air, (printing sharp edges in the air and looking for warpage), we see Sample 3 performing best and similar if not better than PLA.

TABLE 1

| Sample | | # of tests | Length (cm) | | | | | | | | | |
|---|---|---|---|---|---|---|---|---|---|---|---|---|
| | | | 2 | 4 | 6 | 8 | 10 | 12 | 14 | 16 | 18 | 20 |
| PLA (Ultimaker blue) | No glue | 5 | A | A | A | B | B | B | C | D | D | E |
| | Glue stick | 1 | A | A | A | A | A | C | C | D | D | E |
| PLA (no color) | No glue | 2 | A | A | A | A | A | A | A | A | A | A |
| ABS (black) | No glue | 1 | C | D | D | E | E | E | E | E | E | E |
| Sample 1 | No glue | 3 | A | A | A | A | A | B | B | B | C | C |
| Sample 2 | No glue | 1 | A | A | A | C | F | F | F | F | F | F |
| Sample 3 | No glue | 2 | A | A | A | A | A | A | A | B | A | A |
| Sample 4 | No glue | 1 | A | F | F | F | F | F | F | F | F | F |

A = No warpage,
B = Occasional warpage,
C = Small warpage,
D = Medium warpage,
E = Large warpage,
F = Could not print

Example 4. Printed Parts—Mechanical and Optical Properties

2×2 inch, 2.1 mm thick square plaques were printed to measure density, transmittance, and haze. Type IV tensile bars were printed in the XY direction (lying flat on the build plate) to test xy tensile properties. The density is measured by volumetric (weight divided by measured volume) and specific gravity. Specific gravity is a little higher (1-2%) across all our measurements. The fill density is the density of the printed part (as measured by the volumetric or specific gravity method) divided by the bulk density of the material.

The results in Table 2 show increased density and transmittance by increasing temperature (decreasing viscosity) of a resin [in Sample 1] or by switching to a lower viscosity resin [Sample 3 vs. sample 1]. There is a limitation to improving overall transparency via 3D printing alone. It is known that certain post-processing operations, like coating the printed parts or dissolving outer layer, can lead to an increase in transparency. Haze results show that increasing nozzle temp and decreasing viscosity led to lower haze. In addition, while not quantified here, the % overflow also affects fill density (from 0 to 5%), with no more improvements seen after 5%.

TABLE 2

| Sample (print temp/ overflow %) | Fill Density (%) by volume | Transmittance, 2.1 mm, % | Haze, % |
|---|---|---|---|
| Sample 3 (240/5) | 97.4 | 70 | 90.2 |
| Sample 3 (230/5) | 95.0 | 69 | 94.3 |
| Sample 1 (250/5) | 95.4 | 66 | 97.9 |
| Sample 1 (230/5) | 93.1 | 58 | 98.4 |

Mechanical results are listed below in Table 3. Samples 1 and 3 of the invention, give significant improvements in elongation (13-20% strain at break compared to 6% for ABS and PLA) while maintaining similar or improved stress at yields compared to ABS.

TABLE 3

| Printer type | Material | Stress at yield (MPa) | Strain at break (%) |
|---|---|---|---|
| Printed, 5% overflow | Sample 1 | 35 | 19.1 |

TABLE 3-continued

| Printer type | Material | Stress at yield (MPa) | Strain at break (%) |
|---|---|---|---|
| Printed, 5% overflow | Sample 3 | 43 | 13.5 |
| Printed, 5% overflow | ABS | 34 | 6 |
| Printed | PLA | 52 | 6 |

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects:

Aspects of the invention include:
1. An acrylic alloy composition for use in material extrusion additive manufacturing, said acrylic composition comprising:
   a polymer matrix blend comprising:
   1) one or more acrylic polymers having a weight average molecular weight of from 50,000 to 300,000, and preferably from 75,000 to 150,000 g/mol, 2) 5 to 60 weight percent, preferably 9 to 40 weight percent of one or more low viscosity polymers that are compatible, semi-miscible, or miscible with the acrylic polymer, said low viscosity polymers having a melt flow rate of greater than 10 g/10 minutes and preferably greater than 25 g/10 minutes, as measured by ASTM D1238 at 230° C./10.4 kg of force, 3) optionally 0 to 60 weight percent of impact modifiers, preferably 9 to 40 weight percent, wherein said acrylic composition has a viscosity at a shear of 1 $sec^{-1}$ of less than 100,000 Pa-sec, preferably less than 10,000, and more preferably from 50 to 1,000 Pa-sec at a temperature of 230° C., and a viscosity of 20 to 2,000 Pa-s, preferably from 25 to 1,000 Pa-s, and more preferably 30 to 500 Pa-s at a shear rate of 100 $sec^{-1}$ at a temperature of 230° C., as measured by a rotational viscometer according to ASTM C965.

2. The acrylic composition of aspect 1, wherein said acrylic polymers contains less than 5% by weight of polymer having a weight average molecular weight of greater than 500,000 g/mol, preferably less than 2 weight percent greater than 500,000 g/mol.

3. The acrylic composition of aspect 1 or 2, wherein said composition comprises two or more different acrylic polymers.

4. The acrylic composition of any of aspects 1-3, wherein said polymer matrix blend comprises one acrylic polymer having a weight average molecular weight of from 50,000 to 300,000 g/mol of A1), and a second acrylic polymer is the low viscosity polymer A2).

5. The acrylic composition of any of aspects 1-4, wherein said acrylic polymer comprises at least 60 weight percent, preferably 70 to 99.5 of methyl methacrylate monomer units.

6. The acrylic composition of any of aspects 1-5, wherein said low viscosity polymer(s) is a low molecular weight acrylic polymer, having a weight average molecular weight or less than 50,000.

7. The acrylic composition of any of aspects 1-6, wherein said low viscosity polymer(s) is not an acrylic polymer, and is selected from the group consisting of polyesters, cellulosic esters, polyethylene oxide, polypropylene glycol, polyethylene glycol, polypropylene glycol, styrene-acrylonitrile copolymers, polyvinyl chloride, polyvinyl acetate, polyvinyl alcohol, ethylene-vinyl acetate copolymers, olefin-acrylate copolymers, olefin-acrylate-maleic anhydride copolymers, polyvinylidene fluoride and maleic anhydride-styrene-vinyl acetate copolymers.

8. The acrylic composition of aspect 7, wherein said polyester is selected from the group consisting of poly(butylene terephthalate), poly(ethylene terephthalate), polyethylene terephthalate glycol, polylactic acid.

9. The acrylic composition of any of aspects 1-8, wherein said low viscosity polymer is polylactic acid.

10. The acrylic composition of aspect 7, wherein said cellulosic ester is selected from the group consisting of cellulose acetate, cellulose triacetate, cellulose propionate, cellulose acetate propionate, cellulose acetate butyrate, and cellulose acetate phthalate.

11. The acrylic composition of any of aspects 1-10, wherein said impact modifier is a hard core, core-shell impact modifier.

12. The acrylic composition of any of aspects 1-11, wherein said composition is clear, wherein a plaque formed by compression molding from the composition having a thickness of 2 mm has a total white light transmittance of greater than 80%, preferably greater than 90% and most preferably greater than 92%, with a haze of less than 10%, preferably less than 4%, when measured according to ASTM D1003.

13. The acrylic composition of any of aspects 1-12, wherein the impact modifier is refractive index matched with the acrylic matrix polymer, wherein the refractive index of the core-shell particles is within 0.03 units, and preferably within 0.02 units of the matrix polymer alloy.

14. The acrylic composition of any of aspects 1-13, wherein said composition is in the form of a powder, pellets, or filament.

15. The acrylic composition of any of aspects 1-14, further comprising one or more additives, selected from the group consisting of fillers, carbon fiber, milled carbon fiber, carbon powder, carbon nanotubes, glass beads, glass fibers, nano-silica, clays, nanoclays, Aramid fiber, polyaryl ether ketone fibers, $BaSO_4$, talc, $CaCO_3$, graphene, milled carbon fibers, nano-fibers, and hollow spheres, dyes, colorants, metallic particles, metallic flakes, opalescent dyes, fluorescent dyes, and mixtures thereof.

16. An acrylic article made by a material extrusion additive manufacturing process, using the acrylic alloy composition of any of aspects 1-15.

17. The article of aspect 16, wherein said article has one or more of the following properties:
   a) a tensile elongation as measured by ASTM D638 of greater than 10 percent, and preferably greater than 20 percent,
   b) a fill density of greater than 85 percent, preferably greater than 90 percent, and most preferably greater than 95 percent,
   c) a stress at yield of greater than 35 MPa when measured by ASTM D638,
   d) a transmittance of greater than 50%, preferably greater than 60%, and more preferably greater than 65% when measured on a 2.1 mm thick sample using ASTM D1003.

18. A filament for 3-D printing comprising the composition of any of aspects 1-15, wherein the filament varies by less than +/−5% in diameter over ten feet of length.

19. The filament of aspect 18 wherein said filament is a coextruded, multiphase filament.

20. The filament of aspects 18 or 19, wherein said multiphase filament comprises one or more additives that provide visual special effects.

21. A process for forming an extrusion additive (3D) acrylic article, comprising the steps of:
   presetting the software of a 3D printer to a set volume flow and line spacing for the printing of said article;
   feeding the acrylic alloy composition of any of aspects 1-15 in the form of filament, pellets, or powder into the 3D printer;
   feeding by the printer of the acrylic composition melt to a heated nozzle
   depositing the acrylic composition melt at the set location, line spacing and flow rate set by the software, to form an article.

22. The process of aspect 21, wherein the flow rate and/or line spacing represents an overflow of from 10 to 20 volume percent.

23. The process of aspects 21 or 22, wherein said nozzle is heated to between 190° C. and 250° C., and preferably from 210° C. to 240° C.

What is claimed is:

1. An acrylic alloy composition for use in material extrusion additive manufacturing, said acrylic composition comprising:
   a polymer matrix blend comprising:
   1) One or more acrylic polymers having a weight average molecular weight of from 50,000 to 300,000 g/mol,
   2) 5 to 60 weight percent of one or more low viscosity polymers that are compatible, semi-miscible, or miscible with the one or more acrylic polymers, said one or more low viscosity polymers having a melt flow rate of greater than 10 g/10 minutes, as measured by ASTM D1238 at 230° C./10.4 kg of force, and
   3) no hard-core core shell impact modifiers,
   wherein said acrylic composition has a viscosity at a shear of 1 sec$^{-1}$ of less than 100,000 Pa-sec, at a temperature of 230° C., and a viscosity of 20 to 2,000 Pa-s, at a shear rate of 100 sec$^{-1}$ at a temperature of 230° C., as measured by a rotational viscometer according to ASTM C965.

2. The acrylic composition of claim 1, wherein said one or more acrylic polymers contains less than 5% by weight of polymer having a weight average molecular weight of greater than 500,000 g/mol.

3. The acrylic composition of claim 1, wherein said composition comprises two or more different acrylic polymers.

4. The acrylic composition of claim 1, wherein said one or more acrylic polymers comprise at least 60 weight percent of methyl methacrylate monomer units.

5. The acrylic composition of claim 1, wherein said one or more low viscosity polymer(s) is a low molecular weight acrylic polymer, having a weight average molecular weight less than 50,000 g/mol.

6. The acrylic composition of claim 1, wherein said one or more low viscosity polymer(s) is not an acrylic polymer, and is (are) selected from the group consisting of polyesters, cellulosic esters, polyethylene oxide, polypropylene glycol, polyethylene glycol, polypropylene glycol, styrene-acrylonitrile copolymers, polyvinyl chloride, polyvinyl acetate, polyvinyl alcohol, ethylene-vinyl acetate copolymers, olefin-acrylate copolymers, olefin-acrylate-maleic anhydride copolymers, polyvinylidene fluoride and maleic anhydride-styrene-vinyl acetate copolymers.

7. The acrylic composition of claim 6, wherein said polyester is selected from the group consisting of poly (butylene terephthalate), poly (ethylene terephthalate), polyethylene terephthalate glycol, and polylactic acid.

8. The acrylic composition of claim 7, wherein said polyester is polylactic acid.

9. The acrylic composition of claim 6, wherein said cellulosic ester is selected from the group consisting of cellulose acetate, cellulose triacetate, cellulose propionate, cellulose acetate propionate, cellulose acetate butyrate, and cellulose acetate phthalate.

10. The acrylic composition of claim 1, wherein said composition is clear and, when the clear composition is compression molded to a plaque having a thickness of 2 mm, the plaque has a total white light transmittance of greater than 80%, when measured according to ASTM D1003, and has a haze of less than 10%.

11. The acrylic composition of claim 1, wherein said composition is in the form of a powder, pellets or filament.

12. The acrylic composition of claim 1, further comprising one or more additives selected from the group consisting of fillers, carbon fiber, milled carbon fiber, carbon powder, carbon nanotubes, glass beads, glass fibers, nano-silica, clays, nanoclays, Aramid fiber, polyaryl ether ketone fibers, BaSO$_4$, talc, CaCO$_3$, graphene, milled carbon fibers, nanofibers, and hollow spheres, dyes, colorants, pigment, metallic particles, metallic flakes, opalescent dyes, fluorescent dyes, and mixtures thereof.

13. The acrylic composition of claim 1, further comprising one or more additives, selected from the group consisting of carbon fiber, carbon powder, milled carbon fiber, carbon nanotubes, glass beads, glass fibers and mixtures thereof.

14. The acrylic composition of claim 1, further comprising one or more additives, selected from the group consisting of carbon fiber, milled carbon fiber, glass fibers and mixtures thereof.

15. The acrylic composition of claim 1, further comprising one or more additives, selected from the group consisting of colorants, dyes, and inorganic particles, including fluorescent dyes, metal filings, and flakes and mixtures thereof.

16. The acrylic composition of claim 12, wherein the additives are selected from the group consisting of carbon fiber, carbon powder, milled carbon fiber, carbon nanotubes, glass beads, glass fibers, nano-silica, Aramid fiber, polyaryl ether ketone fibers, BaSO$_4$, talc, CaCO$_3$, graphene, nanofibers and hollow glass or ceramic spheres.

17. The acrylic composition of claim 12, wherein the additives are present 0.01 to 50 volume percent of the total volume of the composition.

18. A process of preparing the composition of claim 1, the process comprising dry-blending the polymer matrix blend and optionally additives prior to melting, or directly melt blending the polymer matrix blend and optionally additives together in an extruder, or intimately mixing the polymer matrix blend and optionally additives in a solvent.

* * * * *